US010554729B2

(12) United States Patent
Yerkes

(10) Patent No.: US 10,554,729 B2
(45) Date of Patent: *Feb. 4, 2020

(54) EXPEDITING CONTENT RETRIEVAL USING PEER-TO-PEER NETWORKS

(71) Applicant: BitTorrent, Inc., San Francisco, CA (US)

(72) Inventor: Arthur W. Yerkes, San Francisco, CA (US)

(73) Assignee: Rainberry, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/441,038

(22) Filed: Feb. 23, 2017

(65) Prior Publication Data

US 2017/0163718 A1 Jun. 8, 2017

Related U.S. Application Data

(63) Continuation of application No. 14/147,356, filed on Jan. 3, 2014, now Pat. No. 9,614,907.

(60) Provisional application No. 61/748,885, filed on Jan. 4, 2013.

(51) Int. Cl.
*H04L 29/08* (2006.01)
(52) U.S. Cl.
CPC ............ *H04L 67/06* (2013.01); *H04L 67/104* (2013.01); *H04L 67/1046* (2013.01)
(58) Field of Classification Search
CPC .................................................. H04L 67/104
See application file for complete search history.

(56) References Cited

U.S. PATENT DOCUMENTS

| 7,062,555 | B1 | 6/2006 | Kouznetsov et al. |
| 8,370,420 | B1 | 2/2013 | Decasper et al. |
| 9,215,276 | B2 * | 12/2015 | Gillo ..................... H04L 67/104 |
| 9,614,907 | B2 * | 4/2017 | Yerkes .................... H04L 67/06 |
| 2003/0233551 | A1 | 12/2003 | Kouznetsov et al. |
| 2005/0203851 | A1 * | 9/2005 | King ....................... H04L 63/10 |
| | | | 705/51 |

(Continued)

OTHER PUBLICATIONS

United States Office Action, U.S. Appl. No. 14/147,356, dated Jun. 23, 2016, 11 pages.

*Primary Examiner* — Backhean Tiv
(74) *Attorney, Agent, or Firm* — Fenwick & West LLP

(57) ABSTRACT

A download manger running on a computer system identifies an in-progress download of content by the computer system directly from a content system. The download manager causes the computer system to join a peer-to-peer network in which the content is being shared. The computer system starts to receive data blocks of the content from peer-to-peer network, as it continues the download from the content system. Based on the receipt of the content from the peer-to-peer network and from the content system, the download manager determines whether the computer system should rely primarily on the peer-to-peer network instead of the content system for receiving the content. If a determination is made to rely on the peer-to-peer network instead of the content system, the download manager terminates the download from the content system and continues receiving data blocks of the content from the peer-to-peer network.

15 Claims, 4 Drawing Sheets

(56) References Cited

U.S. PATENT DOCUMENTS

| | | | |
|---|---|---|---|
| 2005/0289237 A1* | 12/2005 | Matsubara | H04L 67/104 709/232 |
| 2006/0206486 A1* | 9/2006 | Strickland | G06Q 10/10 |
| 2007/0113096 A1* | 5/2007 | Zhu | H04L 63/0407 713/180 |
| 2007/0143405 A1* | 6/2007 | Bland | H04L 43/08 709/205 |
| 2007/0174471 A1 | 7/2007 | Van Rossum | |
| 2007/0226368 A1* | 9/2007 | Strickland | G06Q 30/02 709/243 |
| 2008/0034041 A1* | 2/2008 | Kang | H04N 21/25866 709/205 |
| 2008/0065643 A1* | 3/2008 | Park | H04N 5/765 |
| 2008/0112315 A1* | 5/2008 | Hu | H04N 7/17318 370/230 |
| 2008/0133535 A1* | 6/2008 | Fischer | H04L 67/104 |
| 2008/0133538 A1* | 6/2008 | Chavez | H04L 67/104 |
| 2008/0133698 A1* | 6/2008 | Chavez | H04L 67/104 709/217 |
| 2008/0208976 A1* | 8/2008 | Chapalamadugu | H04L 67/104 709/205 |
| 2008/0307094 A1* | 12/2008 | Karonen | H04L 41/0896 709/226 |
| 2009/0259667 A1* | 10/2009 | Wang | H04L 45/125 |
| 2009/0327079 A1 | 12/2009 | Parker et al. | |
| 2010/0191756 A1* | 7/2010 | Terao | H04L 67/104 707/758 |
| 2011/0035503 A1* | 2/2011 | Zaid | H04L 63/0407 709/228 |
| 2011/0055320 A1* | 3/2011 | Gillo | H04L 67/104 709/203 |
| 2011/0093607 A1* | 4/2011 | Wang | H04L 65/4084 709/231 |
| 2011/0225311 A1* | 9/2011 | Liu | H04L 45/125 709/231 |
| 2011/0225312 A1* | 9/2011 | Liu | H04L 12/18 709/231 |
| 2012/0311010 A1* | 12/2012 | Shah | H04L 67/1063 709/201 |
| 2014/0173022 A1* | 6/2014 | Morrison, III | H04L 67/1063 709/217 |

\* cited by examiner

EXPEDITING CONTENT RETRIEVAL USING PEER-TO-PEER NETWORKS

CROSS-REFERENCE TO RELATED APPLICATIONS

This application is a continuation application of U.S. patent application Ser. No. 14/147,356, filed on Jan. 3, 2014, which claims the benefit of U.S. provisional application 61/748,885, filed on Jan. 4, 2013. Each application is incorporated by reference herein in its entirety.

BACKGROUND

The embodiments described generally relate to downloading content, particularly to using a peer-to-peer network to expedite the receipt of content.

Content such as movies, movie trailers, video game trailers and the like is often obtained via the Internet by a user computer requesting and receiving the content from a distribution server. However, a server can become overloaded, for example, if multiple user computers request the content from the server simultaneously. As a result of the server becoming overloaded, the requesting computer may experience long delays in receiving the content.

SUMMARY

The described embodiments provide methods, computer program products, and systems for managing the source from which content is received. A download manger running on a computer system identifies an in-progress download of content by the computer system directly from a content system that satisfies certain defined criteria. The download manager causes the computer system to join a peer-to-peer network in which that content is being shared. The computer system starts to receive data blocks of the content from the peer-to-peer network. At that point, the computer system is receiving the content from both the peer-to-peer network and from the content system.

Based on the receipt of the content from the peer-to-peer network and from the content system, the download manager determines whether the computer system should rely on the peer-to-peer network instead of the content system for receiving the content. If a determination is made to rely on the peer-to-peer network instead of the content system, the download manager terminates the download from the content system and continues receiving data blocks of the content from the peer-to-peer network. However, if a data block is not received from the peer-to-peer network within a threshold period of time, the download manger requests the specific data block from the content system.

The features and advantages described in this summary and the following detailed description are not all-inclusive. Many additional features and advantages will be apparent to one of ordinary skill in the art in view of the drawings, specification, and claims hereof.

The figures depict various embodiments for purposes of illustration. One skilled in the art will readily recognize from the following discussion that alternative embodiments of the structures and methods illustrated herein may be employed without departing from the principles described herein.

DETAILED DESCRIPTION

Figure 1:
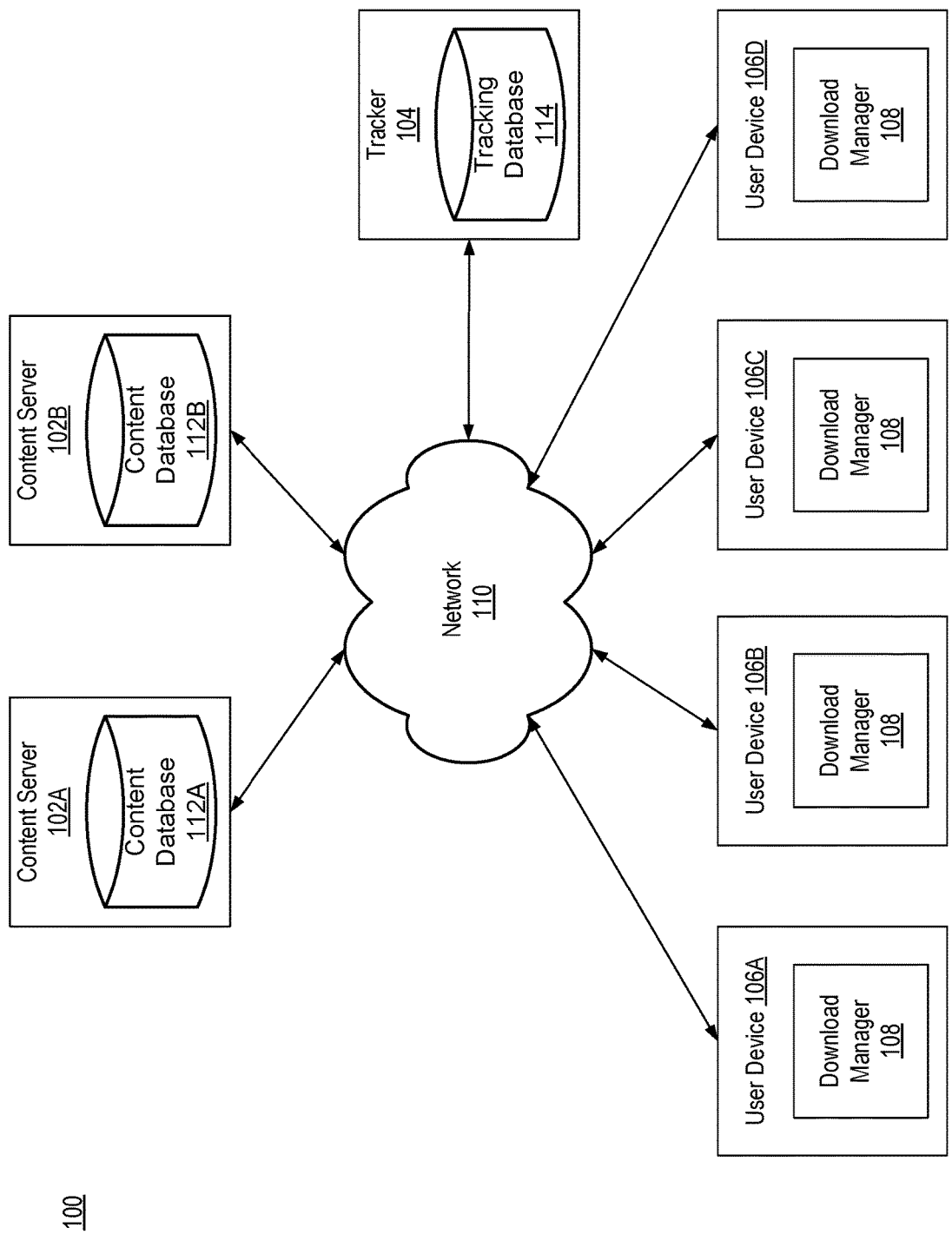
FIG. 1 is a block diagram of a networking environment, according to one embodiment.

FIG. 1 is a block diagram of a networking environment 100 according to one embodiment. The environment 100 includes content servers 102A and 102B, a tracker 104, and user devices 106A through 106D that are connected to a network 110. Although the illustrated environment 100 only includes two content servers 102, a single tracker 104, and a limited number of user devices 106, other embodiments include additional numbers of each (e.g., more content servers 102 and user devices 106).

FIG. 1 and the other figures use like reference numerals to identify like elements. A letter after a reference numeral, such as "106A," indicates that the text refers specifically to the element having that particular reference numeral. A reference numeral in the text without a following letter, such as "106," refers to any or all of the elements in the figures bearing that reference numeral.

The content servers 102 are computer systems that make content available to user computers 106 for download. A content server 102 includes a content database 112 in which the content made available by the server 102 is stored. The content stored in the content database 112 may include, for example, music files, video files, document files, photo files, software files, or any other type of files.

A content server 102 allows user devices 106 to request content in its entirety or only specific portions (i.e., data blocks) of the content. A request for content in its entirety is referred to here as a continuous request for the content. A request for specific data blocks of the content is referred to as a range request. In one embodiment, the continuous requests and range requests received by content servers 102 are HTTP type of requests.

When a content server 102 receives a request for content from a user device 106, the content server 102 determines the type of the request. If the request is a continuous request for the content, the content server 102 identifies the requested content in the database 112 and transmits data blocks of the content to the user device 106. In one embodiment, the content server 102 transmits the data blocks to the user device 106 according to a sequence in which the data blocks are presented as part of the content. When a content server 102 receives a request for a specific data block of content or a range of data blocks (e.g., data blocks 5-10) from a user device 106, the content server 102 identifies the requested data blocks in its respective content database 112 and transmits the data blocks to the user device 106.

The tracker 104 is a computer system that assists user devices 106 in joining a swarm. A swarm is a peer-to-peer network that includes a number of peers that have established connections among themselves and are sharing specific content. For example, a swarm may be created to allow a video file to be distributed among the peers of the swarm. A swarm includes at least one seed. A seed is a peer that has all of the data blocks of the content being shared in the swarm and shares the data blocks with other peers of the swarm. In one embodiment, the content is shared in a swarm according to the well-known BitTorrent protocol. According to the BitTorrent protocol, when a peer in a swarm receives a data block from another peer in the swarm, the receiving peer becomes a source for that data block and can provide it to other swarm peers. This allows the content to be distributed without solely relying on the swarm's one or more seeds.

The tracker 104 stores information on swarms that user devices 106 can join. In one embodiment, for each swarm, the tracker 104 stores in a tracking database 114 an identifier that indicates content being shared in the swarm and information as to peers that are part of the swarm. In one embodiment, the identifier indicating the content being shared is a magnet link. A magnet link is a cryptographic value that uniquely identifies the content. In one embodiment, the information stored by the tracker 104 in the tracking database 114 for each peer of a swarm includes an Internet Protocol (IP) address and a port number of the peer.

In one embodiment, when a peer joins a swarm, the peer notifies the tracker 104. The tracker 104 updates the tracking database 114 to indicate that the peer is part of the swarm. In one embodiment, when a peer is part of a swarm, the peer has to periodically notify the tracker 104 that it is still part of the swarm. If the tracker 104 does not receive a notification from the peer within a certain amount of time of a prior notification, it updates the tracking database 114 to indicate that the peer is no longer part of the swarm.

The tracker 104 processes requests from user devices 106 for information as to peers that are part of a swarm in which specific content is being shared. In one embodiment, such a request includes the magnet link of the content. When the tracker 104 receives from a user device 106 a request for information as to peers that are part of a swarm in which specific content is being distributed, the tracker 104 identifies in the request the magnet link of the content. The tracker 104 uses the magnet link to search the tracking database 114 and determine whether there is a swarm sharing the content.

If there is no swarm sharing the content, the tracker 104 notifies the requesting user device 106 that no swarm currently exists for the content. On the other hand, if there is currently a swarm sharing the content, the tracker 104 provides the requesting user device 106 with information on one or more peers that are part of the swarm. The information provided by the tracker 104 allows the requesting user device 106 to establish connections with the peers of the swarm (i.e., join the swarm) in order to start receiving data blocks of the content. In one embodiment, the information provided by the tracker 104 for each peer is the IP address and port number of the peer.

Each user device 106 in the environment 100 is a computer system that is capable of communicating with the other entities of the environment. A user device 106 may be, for example, a personal computer, a mobile phone, a tablet, a personal digital assistant (PDA), a television set-top box or any other computer system. A user device 106 can communicate with a content server 102 to request and receive content from the server 102. Additionally, a user device 106 can join a swarm (by becoming a peer in the swarm) and obtain the content being shared in the swarm.

In one embodiment, a user device 106 includes a download manager 108 that manages the source from which content is received. The download manager 108 monitors communications with entities via the network 110. In one embodiment, the download manger 108 monitors for the user device 106 downloading content from a content server 102 that satisfies certain defined criteria. For example, the download manager 108 may monitor for the download of content greater than 10 megabytes (MB) from a content server 102. When the download manger 108 determines that content is being downloaded that satisfies the criteria, the download manger 108 manages the downloading of the content.

As part of managing the download, the download manager 108 predicts whether receipt of the content would be expedited if instead of continuing the download from the server 102, the user device 106 relied primarily on a swarm to provide the content. As part of the prediction, the download manager 108 also has the user device 106 become a peer in a swarm sharing the content. For example, if music file X is being downloaded from content server 102A, the download manager 108 joins a swarm in which music file X is being shared. In one embodiment, the user device 106 joins the swarm by establishing connections with peers that the tracker 104 indicated are part of the swarm.

After the user device 106 has joined the swarm, the download manger 108 begins to request data blocks from the swarm that have not yet been received from the content server 102. Therefore, the client device 106 is receiving the remaining data blocks from the swarm and additionally from the content server 102.

The download manager 108 compares the timing of data blocks received from the content server 102 and the swarm. In one embodiment, if a data block is received from the swarm before the same block is received from the content server 102 via the download, the download manager 108 switches over to relying primarily on the peers of the swarm to provide the content (i.e., the download manager 108 predicts that receipt of the content will be expedited if it relies primarily on the swarm). As part of the switchover, the download manager 108 terminates the download from the content server 102. Further, for each data block of the content that has not yet been received, the download manager 108 first attempts to receive the data block from the peers of the swarm. If the data block is not received from the swarm within a certain amount of time (within a threshold amount of time), the download manager 108 makes a range request to the content server 102 for the specific data block that has not been received. Therefore, even though the download manager 108 is relying/counting on the swarm to provide the content, the download manager 108 will still request a data block from the content server 102 if it is not received fast enough from the swarm.

As an example of the process performed by the download manager 108, assume that the people of a large office all request to update a program on their computer around the same time. The server providing update files for the program to the computers becomes overloaded by the number of requests. Instead of waiting a long period of time for the update files, a computer with the download manager 108 can terminate the download from the sever and can receive the update files from a swarm that includes multiple office computers that already have one or more of the files. Not only does this allow the computer to quickly receive the update files, but it also reduces the load on the server.

The network 110 enables communications among the entities connected to it. In one embodiment, the network 110 is the Internet and uses standard communications technologies and/or protocols. Thus, the network 110 can include links using technologies such as Ethernet, 802.11, worldwide interoperability for microwave access (WiMAX), 3G, digital subscriber line (DSL), asynchronous transfer mode (ATM), InfiniBand, PCI Express Advanced Switching, etc. Similarly, the networking protocols used on the network 110 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 110 can be represented using technologies and/or formats including the hypertext markup language (HTML), the extensible markup language (XML), etc. In addition, all or some of links can be encrypted using conventional encryption technologies such as the secure sockets layer (SSL), transport layer security (TLS), virtual private networks (VPNs), Internet Protocol security (IPsec), etc. In another embodiment, the entities use custom and/or dedicated data communications technologies instead of, or in addition to, the ones described above.

Figure 2:
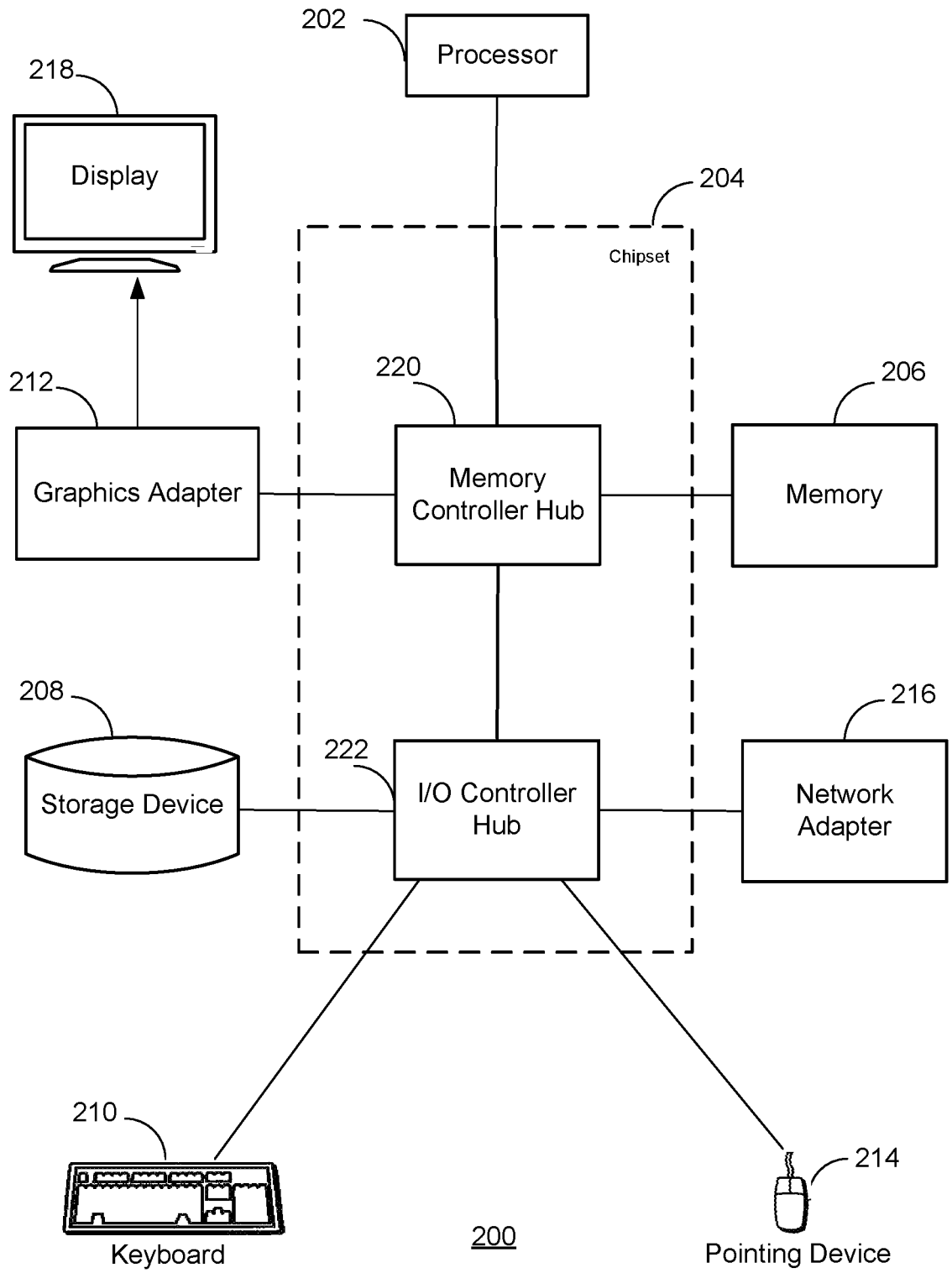
FIG. 2 is a block diagram illustrating a functional view of a typical computer system for use as a content server, a tracker, and/or a peer, according to one embodiment.

FIG. 2 is a block diagram illustrating a functional view of a typical computer system 200 for use as a content server 102, the tracker 104, and/or a user device 106. Illustrated are at least one processor 202 coupled to a chipset 204. The chipset 204 includes a memory controller hub 220 and an input/output (I/O) controller hub 222. A memory 206 and a graphics adapter 212 are coupled to the memory controller hub 220, and a display device 218 is coupled to the graphics adapter 212. A storage device 208, keyboard 210, pointing device 214, and network adapter 216 are coupled to the I/O controller hub 222. Other embodiments of the computer 200 have different architectures. For example, the memory 206 is directly coupled to the processor 202 in some embodiments.

The storage device 208 is a non-transitory computer-readable storage medium such as a hard drive, compact disk read-only memory (CD-ROM), DVD, or a solid-state memory device. The memory 206 holds instructions and data used by the processor 202. The pointing device 214 is a mouse, track ball, or other type of pointing device, and is used in combination with the keyboard 210 to input data into the computer system 200. The graphics adapter 212 displays images and other information on the display device 218. The network adapter 216 allows the computer system 200 to communicate via the network 110. Some embodiments of the computer system 200 have different and/or other components than those shown in FIG. 2.

The computer system 200 is adapted to execute computer program modules for providing functionality described herein. As used herein, the term "module" refers to computer program instructions and other logic used to provide the specified functionality. Thus, a module can be implemented in hardware, firmware, and/or software. In one embodiment, program modules formed of executable computer program instructions are stored on the storage device 208, loaded into the memory 206, and executed by the processor 202.

The type of computers systems 200 used by the content servers 102, the tracker 104, and the user devices 106 can vary depending upon the embodiment and the processing power used. For example, the computer system of a user device 106 may have less processing power than the computer system of the content server 102.

Figure 3:
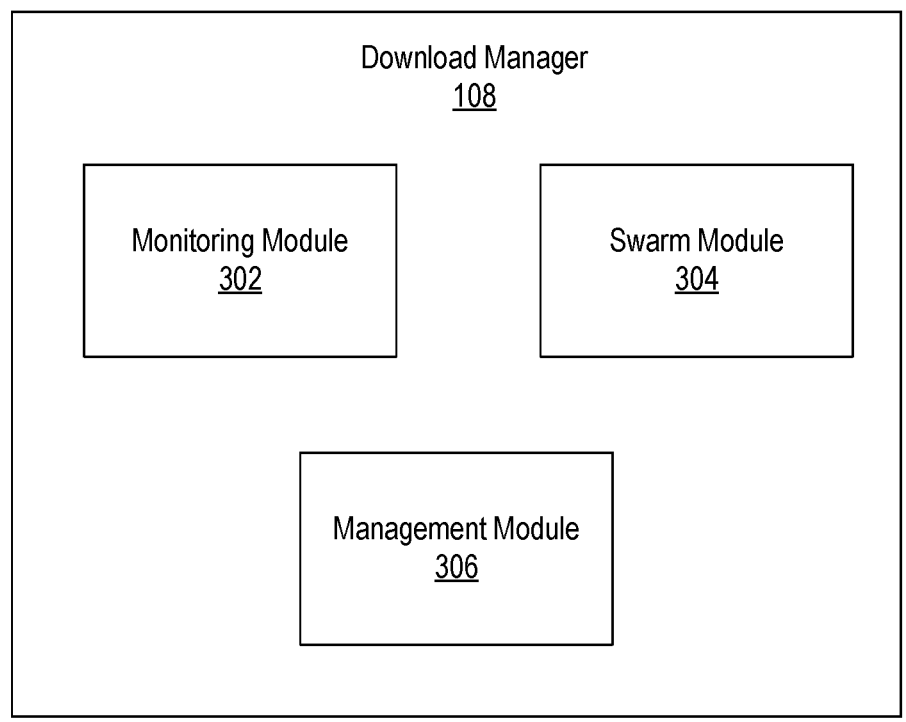
FIG. 3 is a block diagram illustrating a detailed view of a download manager, according to one embodiment.

FIG. 3 is a block diagram illustrating a detailed view of the download manager 108 of a user device 106, according to one embodiment. The download manager 108 includes a monitoring module 302, a swarm module 304, and a management module 306. Those of skill in the art will recognize that other embodiments of the download manager 108 can have different and/or other modules than the ones described here, and that the functionalities can be distributed among the modules in a different manner.

The monitoring module 302 monitors communications with entities via the network 110. In one embodiment, the monitoring module 302 is a Layered Service Provider (LSP). In one embodiment, when the user device 106 creates a socket to communicate with an entity (e.g., content server 102 or user device 106) via the network 110, the monitoring module 302 includes one or more objects in the socket to monitor communications with the entity. In one embodiment, the monitoring module 302 may override the operation of one or more of the following socket functions to monitor communications via the socket: socket( ), connect( ) send( ) and recv( ).

When the monitoring module 302 identifies via the monitoring that the user device 106 is beginning to download content from a content server 102, the monitoring module 302 determines whether the download satisfies certain criteria. The criteria may include one or more of the following: that content being downloaded is greater than a certain size (e.g., bigger than 10 MB), that the content is being downloaded via a connection with the content server 102 that is not secure, that the connection is a continuous connection established in response to a continuous request through which all of the data blocks of the content are to be provided.

If the download from the content server 102 satisfies the criteria, the monitoring module 302 determines that the management module 306 should manage the source from where the downloading content is received. The monitoring module 302 indicates to the management module 306 to manage the receipt of the content.

When the monitoring module 302 notifies the management module 306 to manage the source from where the content is being downloaded, the monitoring module 302 provides the management module 306 with information about the download. In one embodiment, the information provided by the monitoring module 302 includes one or more of the following: the host header of the content server 102 from where the content is being downloaded and the HTTP, host header, eTag, modification date, path, and content size of the content.

The swarm module 304 assists the user device 106 in joining a swarm (i.e., becoming a peer in the swarm) and obtaining content from the swarm. In one embodiment, the swarm module 304 is a μTorrent client provided by BitTorrent, Inc. The swarm module 304 processes requests to join swarms in which specific content is being shared. The requests may be received, for example, from a user of the user device 106 or from the management module 306. In one embodiment, a request to join a swarm sharing content includes a magnet link of the content.

In one embodiment, when the swarm module 304 receives a request to join a swarm for obtaining specific content, the swarm module 304 provides the magnet link of the content to the tracker 104 and requests information on peers that are part of the swarm. If the tracker 104 is aware of a swarm sharing the content, the swarm module 304 receives from the tracker 104 information on peers (e.g., IP addresses and port numbers of the peers) that are part of the swarm. The swarm module 304 has the device 106 join the swarm by establishing connections with one or more of the swarm's peers.

In another embodiment, instead of using the tracker 104 to join a swarm, the swarm module 304 uses a distributed hash table (DHT). According to this method, the swarm module 304 includes a routing table with information on a number of peers. Each peer in the routing table has a node ID that is unique to that peer. The swarm module 304 identifies a certain number of peers in the table whose node ID is closest to an infohash of the content the swarm module 304 wishes to obtain from a swarm. The infohash uniquely identifies the content. In one embodiment, the infohash is a magnet link of the content.

The swarm module 304 communicates with each identified peer and requests information on peers that are part of a swarm sharing the content. If the identified peer is not aware of any peers, the identified peer provides the swarm module 304 with information on peers in its respective routing table whose node IDs are closest to the infohash of the content. The swarm module 304 contacts those peers and repeats the process of requesting information on peers sharing the contact.

If a peer contacted by the swarm module 304 is aware of one or more peers that are part of the swarm, the swarm module 304 receives peer information (e.g., IP addresses and port numbers) of the swarming peers from the contacted peer. The swarm module 304 establishes connections with the swarming peers to join the swarm.

In one embodiment, either through the tracker 104 or DHT, if the swarm module 304 is unable to join a swarm, the swarm module 304 periodically makes another attempt to join the swarm (e.g., once per minute). In one embodiment, after a certain number of tries, the swarm module 304 stops attempting to join a swarm.

In one embodiment, the swarm module 304 obtains content from the swarm it joins according to the BitTorrent protocol. In one embodiment, through the swarm, the data blocks of the content are obtained by the swarm module 304 in random order. In one embodiment, the swarm module 304 can request specific data blocks from peers of the swarm.

The management module 306 manages the source from where content is received for downloads identified by the monitoring module 302. When the monitoring module 302 identifies a download of content from a content server 102 as satisfying defined criteria, the management module 306 generates a magnet link for the content. In one embodiment, the management module 306 generates the magnet link by performing a SHA-1 hash of the information provided by the monitoring module 302 for the download. In one embodiment, the management module 306 performs a SHA-1 of the following information separated by exclamation marks: the host header of the content server 102, the HTTP eTag of the content, the last modification date of the content, and a path of the content.

The management module 306 requests from the swarm module 304 that it join a swarm sharing the content and provides the generated magnet link of the content. As the content is being downloaded from content server 102, the management module 306 periodically determines whether the swarm module 304 has been able to join a swarm. In one embodiment, the management module 306 makes the determination by obtaining information from the swarm module 304 as to the number of data blocks of the content that it has received. If the swarm module 304 indicates that it has received at least one data block of the content from a swarm, the management module 306 determines that the swarm module 304 has joined a swarm sharing the content.

When it is determined the swarm module 304 has joined a swarm, the management module 306 determines whether to switchover to relying primarily on the swarm for receiving the content. In one embodiment, the management module 306 determines whether to switchover by predicting whether it will receive the content faster by relying primarily on the swarm rather than relying on the download from the content server 102.

In one embodiment, to make the prediction, the management module 306 identifies the last data block of the content received from the content server 102 via the continuous download of the content. For the remaining data blocks of the content that have not yet been received from the content server 102, the download manager 108 requests from the swarm module 304 that it obtain the remaining data blocks from the swarm even though the remaining data blocks are also being download from the content server 102. Therefore, the client device 106 is downloading two copies of remaining data blocks, one from the content server 102 and another from the swarm until a determination is made as to whether to switch to relying primarily on the swarm to receive the content or abandon the attempt. In one embodiment, the remaining data blocks are requested from the swarm in the same order in which they are transmitted from the content server 102 to the user device 106. In one embodiment, the management module 306 requests via the swarm module 304 the remaining data blocks from the swarm one at a time. In one embodiment, the management module 306 waits to receive a requested data block from the swarm before requesting the next data block from the swarm through the swarm module 304.

In one embodiment, if the download from the swarm falls behind the download from the content server 102 by a certain amount (e.g., 2 MB), the management module 306 determines that it would not be beneficial for the client device 106 to switchover to relying on the swarm to provide the content. The management module 306 stops the request of data blocks from the swarm (i.e., stops the download from swarm) and allows the download to finish from the content server 102.

For example, assume that a 15 MB file is being downloaded from a content sever 102 and when 4.0 MB of the file have been downloaded, the swarm module 304 joins a swarm distributing the file. The management module 306 starts requesting data blocks of the file from the swarm starting at 4.0 MB. If 7.0 MB of the file have been received from the content server 102 and at that point the download from the swarm is at 5.0 MB, the management module 306 may determine that there would be no benefit in receiving content from the swarm instead of the content server 102. As a result of the determination, the management module 306 stops requesting data blocks from the swarm.

In one embodiment, when the management module 306 requests a data block from the swarm, if the data block is not received within a certain time period, the management module 306 makes a range request for the specific data block from the content server 102. The range request may be made so that download from the swarm does not fall too far behind the content server 102 download as a result of certain data blocks. In another embodiment, instead of making a range request, if a data block is not received within a certain time period from the swarm, the management module 306 skips the data block and requests the next block.

In one embodiment, during the downloads from the content server 102 and the swarm, if a data block is received from the swarm before the same block is received from the content server 102, the management module 306 determines to switchover to relying primarily on the swarm to provide the content. The management module 306 makes the determination based on a prediction that it will receive the content faster from the swarm than it would via the continuous download from the content server 102.

In another embodiment, to determine whether to switchover, the management module 306 monitors a speed at which data blocks are being received from the swarm. Additionally, the management module 306 monitors a speed at which data blocks are being received from the content server 102 via the continuous download. The speeds may be, for example, current download speeds or average download speeds (e.g., a straight average or a weighted average where the speeds of more recent data blocks are given more weight). In one embodiment, if at any point the speed at which the data blocks are being received from the peers of the swarm is equal or greater than the speed at which the content is being received from the content server 102, the management module 306 determines to switchover to relying primarily on the swarm for the download.

When a determination is made to switchover to relying primarily on the swarm for the download, the management module 306 performs the switchover by terminating the continuous download of the content from the content server 102. In one embodiment, the management module 306 terminates the download by closing the socket through which the content was being downloaded from the content server 102. In one embodiment, the management module 306 substitutes the socket with the content server 102 for a socket used to receive data blocks from the swarm. Substituting the sockets allows an application of the client device 106 (e.g., an application that initiated the request for the content from the content server 102) to have access to the data blocks provided by the swarm.

For each data block that not yet been received, the management module 306 makes a request to the swarm module 304 that it obtain the data block from the swarm. In one embodiment, the management module 306 requests the data blocks from the swarm module 304 in the same order they would have been transmitted by the content server 102. If the swarm module 304 is unable to obtain a requested data block from the swarm within a certain time period of making the request (e.g., within one second), the swarm module 304 makes a range request to the content server 102 for the data block. In one embodiment, when all of the data blocks of the content are obtained, the management module 306 instructs the swarm module 304 to stay in the swarm to behave as a seed in the swarm.

Figure 4:
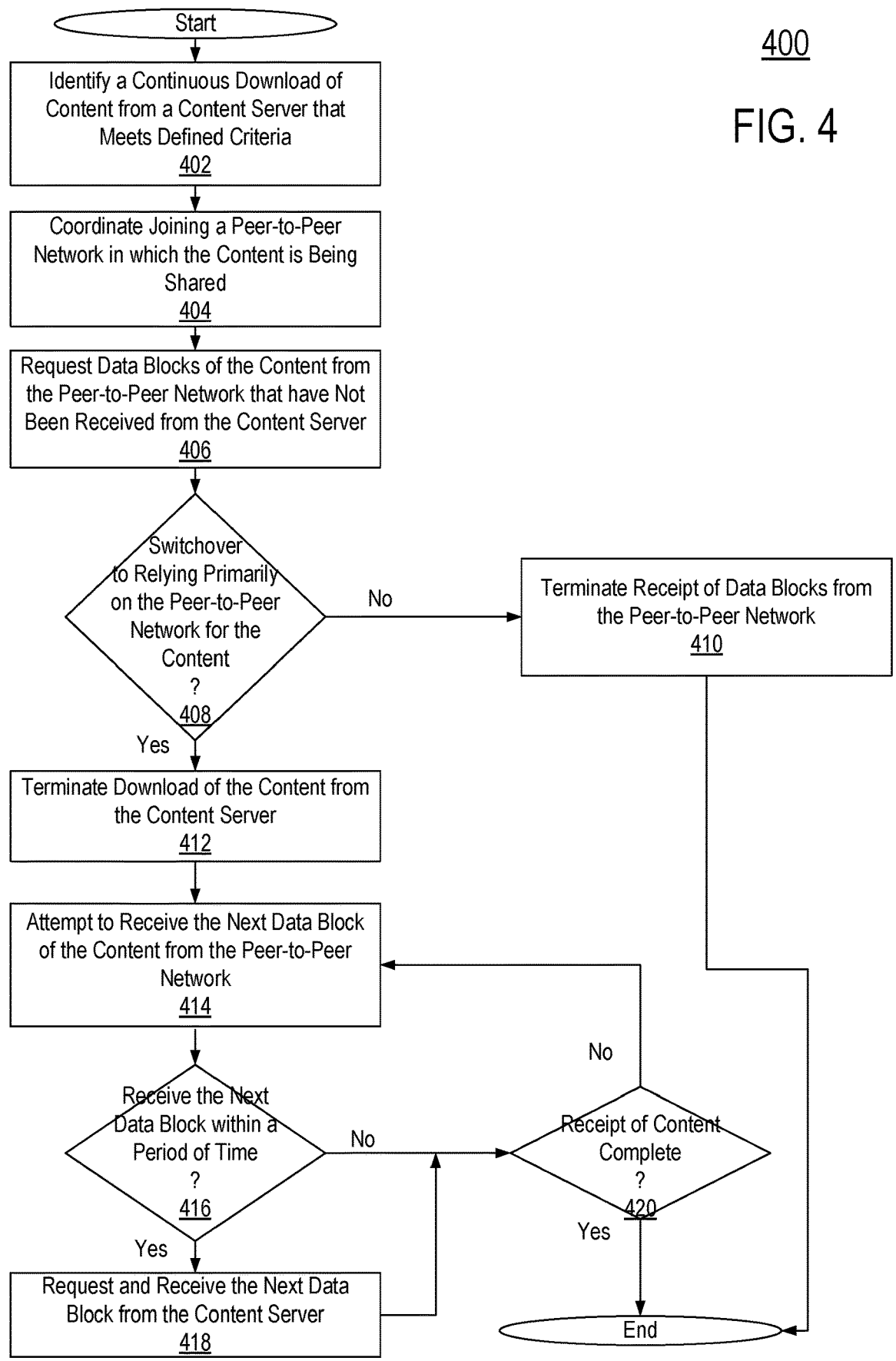
FIG. 4 illustrates a flow chart of a process performed by a download manager of a user device in managing the source from which content is received, according to one embodiment.

FIG. 4 illustrates a flow chart of a process 400 performed by a download manager 108 of a user device 106 in managing the source from which content is received, according to one embodiment. Those of skill in the art will recognize that other embodiments can perform the steps of FIG. 4 in different orders. Moreover, other embodiments can include different and/or additional steps than the ones described above.

The download manager 108 identifies 402 a continuous ongoing download of content from a content sever 102 that meets certain defined criteria. As data blocks of the content are being received from the content server 102, the download manger 108 coordinates 404 the user device 106 joining a peer-to-peer network (a swarm) in which the content is being shared. The download manager 108 requests 406 data blocks of the content from the peer-to-peer network that have not yet been received from the content server 102.

Based on the data blocks being received from the content server 102 and the peer-to-peer network, the download manager 108 determines 408 whether to switchover to relying primarily on the peer-to-peer network for receiving the content. In one embodiment, the download manager 108 determines to switchover if a data block is received from the swarm before the same block is received from the content server 102. The download manager 108 determines not to switchover is the download from the swarm falls behind the download from the content server 102 by more than a certain amount.

If the download manager 108 determines not to switchover to relying primarily on the peer-to-peer network, the download manger 108 terminates 410 the receipt of data block from the peer-to-peer network and completes the download of the content from the content server 102. On the other hand, if the download manager 108 determines to switchover, the download manager 108 terminates 414 the download of the content from the content server 102. The download manger 108 attempts to receive 414 from the peer-to-peer network the next data block of the content that has not yet been received.

The download manger 108 determines 416 whether the next data block is received within a certain period of time. If next data block is not received from the peer-to-peer network within the period of time, the download manager 108 requests and receives 418 the next data block from the content server 102 by making a range request to the server 102. Once the next data block is received from the peer-to-peer network within the period of time or after from the content server 102, the download manager 108 determines 420 whether the receipt of content is complete (i.e., all data blocks of the content have been received by the user device 106). If the receipt of content is not complete, steps 414 and 416 repeat for the subsequent data block. However, if the receipt of content is complete, the process 400 ends.

Reference in the specification to "one embodiment" or to "an embodiment" means that a particular feature, structure, or characteristic is included in at least one embodiment described. The various appearances of the phrase "in one embodiment" or "a preferred embodiment" in various places in the specification are not necessarily referring to the same embodiment.

Some portions of the above are presented in terms of methods and symbolic representations of operations on data bits within a computer memory. These descriptions and representations are the means used by those skilled in the art to most effectively convey the substance of their work to others skilled in the art. A method is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the preceding discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Finally, it should be noted that the language used in the specification has been principally selected for readability and instructional purposes, and may not have been selected to delineate or circumscribe the subject matter described. Accordingly, the disclosure is intended to be illustrative, but not limiting, of the scope described.

What is claimed is:

1. A computer-implemented method for managing the receiving of digital content, the method comprising:
identifying an in-progress download of content by a computer system from a content system;
joining, by the computer system during the download of the content from the content system, a peer-to-peer network in which the content is being shared by at least one peer in the peer-to-peer network;
responsive to joining the peer-to-peer network, simultaneously downloading, by the computer system, data blocks of the content from the peer-to-peer network and from the content system via the in-progress download;
determining, by the computer system based on the simultaneous downloading, whether to first rely on the peer-to-peer network for receiving the content before relying on the content system for receiving the content;
responsive to determining to first rely on the peer-to-peer network, terminating, by the computer system, the in-progress download from the content system;
receiving, by the computer system, at least a portion of the content through the peer-to-peer network; and
responsive to a difference between an amount of the content received from the peer-to-peer network and an amount of the content received from the content system since joining the peer-to-peer network being greater than a threshold, determining not to rely on the peer-to-peer network.

2. The method of claim 1, wherein determining whether to first rely on the peer-to-peer network comprises:
responsive to the receipt of data blocks of the content from the peer-to-peer network being faster than via the download from the content system, determining to first rely on the peer-to-peer network instead of the content system for receiving the content.

3. The method of claim 1, wherein determining whether to first rely on the peer-to-peer network comprises:
responsive to receiving a data block of the content from to peer-to-peer network before receiving the data block via the download from the content system, determining to first rely on the peer-to-peer network instead of the content system for receiving the content.

4. The method of claim 1, further comprising:
responsive to terminating the in-progress download from the content system and not receiving a data block of the content from the peer-to-peer network within a threshold period, requesting the data block from the content system.

5. The method of claim 1, further comprising:
responsive to determining not to rely on the peer-to-peer network, terminating the downloading of data blocks of the content from the peer-to-peer network.

6. A computer program product stored on a non-transitory computer-readable storage medium having computer-executable instructions which cause one or more processors to performs steps comprising:
identifying an in-progress download of content by a computer system from a content system;
joining, by the computer system during the download of the content from the content system, a peer-to-peer network in which the content is being shared by at least one peer in the peer-to-peer network;
responsive to joining the peer-to-peer network, simultaneously downloading, by the computer system, data blocks of the content from the peer-to-peer network and from the content system via the in-progress download;
responsive to receiving a data block of the content from to peer-to-peer network before receiving the data block via the download from the content system, determining, by the computer system based on the simultaneous downloading, to first rely on the peer-to-peer network for receiving the content before relying on the content system for receiving the content;
responsive to determining to first rely on the peer-to-peer network, terminating, by the computer system, the in-progress download from the content system;
receiving, by the computer system, at least a portion of the content through the peer-to-peer network; and
responsive to a difference between an amount of the content received from the peer-to-peer network and an amount of the content received from the content system since joining the peer-to-peer network being greater than a threshold, determining not to rely on the peer-to-peer network.

7. The computer program product of claim 6, wherein determining whether to first rely on the peer-to-peer network comprises:
responsive to the receipt of data blocks of the content from the peer-to-peer network being faster than via the download from the content system, determining to first rely on the peer-to-peer network instead of the content system for receiving the content.

8. The computer program product of claim 7, wherein the computer-executable instructions further cause the one or more processors to performs steps comprising:
responsive to determining not to rely on the peer-to-peer network, terminating the downloading of data blocks of the content from the peer-to-peer network.

9. The computer program product of claim 6, wherein determining whether to first rely on the peer-to-peer network comprises:
responsive to receiving a data block of the content from to peer-to-peer network before receiving the data block via the download from the content system, determining to first rely on the peer-to-peer network instead of the content system for receiving the content.

10. The computer program product of claim 6, wherein the computer-executable instructions further cause the one or more processors to performs steps comprising:
responsive to terminating the in-progress download from the content system and not receiving a data block of the content from the peer-to-peer network within a threshold period, requesting the data block from the content system.

11. A computer system for managing the receiving of digital content, the system comprising:
one or more computer processors; and
a non-transitory computer-readable storage medium storing computer-executable instructions which when executed by the one or more computer processors cause the one or more computer processors to perform steps comprising:
identifying an in-progress download of content by the computer system from a content system;
joining, during the download of the content from the content system, a peer-to-peer network in which the content is being shared by at least one peer in the peer-to-peer network;
responsive to joining the peer-to-peer network, simultaneously downloading data blocks of the content from the peer-to-peer network and from the content system via the in-progress download;
responsive to receiving a data block of the content from to peer-to-peer network before receiving the data block via the download from the content system determining, based on the simultaneous downloading, to first rely on the peer-to-peer network for receiving the content before relying on the content system for receiving the content;
responsive to determining to first rely on the peer-to-peer network, terminating the in-progress download from the content system;
receiving at least a portion of the content through the peer-to-peer network; and
responsive to a difference between an amount of the content received from the peer-to-peer network and an amount of the content received from the content system since joining the peer-to-peer network being greater than a threshold, determining not to rely on the peer-to-peer network.

12. The system of claim 11, wherein determining whether to first rely on the peer-to-peer network comprises:
responsive to the receipt of data blocks of the content from the peer-to-peer network being faster than via the download from the content system, determining to first rely on the peer-to-peer network instead of the content system for receiving the content.

13. The system of claim 11, wherein determining whether to first rely on the peer-to-peer network comprises:
responsive to receiving a data block of the content from to peer-to-peer network before receiving the data block via the download from the content system, determining to first rely on the peer-to-peer network instead of the content system for receiving the content.

14. The system of claim 11, wherein the computer-executable instructions further cause the one or more processors to performs steps comprising:
responsive to terminating the in-progress download from the content system and not receiving a data block of the content from the peer-to-peer network within a threshold period, requesting the data block from the content system.

15. The system of claim 11, wherein the computer-executable instructions further cause the one or more processors to performs steps comprising:
responsive to determining not to rely on the peer-to-peer network, terminating the downloading of data blocks of the content from the peer-to-peer network.

* * * * *